US006610341B2

(12) United States Patent
Vinelli

(10) Patent No.: US 6,610,341 B2
(45) Date of Patent: Aug. 26, 2003

(54) METHOD FOR PRESERVING PROCESSED GRAIN AND ANIMAL FEED COMPRISING THE SAME

(75) Inventor: Monique F. Vinelli, Marietta, GA (US)

(73) Assignee: International Stock Food Corporation, Marietta, GA (US)

( * ) Notice: Subject to any disclaimer, the term of this patent is extended or adjusted under 35 U.S.C. 154(b) by 0 days.

(21) Appl. No.: 09/919,950

(22) Filed: Aug. 2, 2001

(65) Prior Publication Data

US 2003/0072857 A1 Apr. 17, 2003

(51) Int. Cl.⁷ .................................................. A23K 3/00
(52) U.S. Cl. ....................... 426/335; 426/535; 426/547; 426/807
(58) Field of Search ................................ 426/335, 535, 426/807, 547

(56) References Cited

U.S. PATENT DOCUMENTS

| | | | | |
|---|---|---|---|---|
| 2,825,651 A | | 3/1958 | Loo | 99/171 |
| 3,169,068 A | | 2/1965 | Bloch | 99/171 |
| 3,184,314 A | * | 5/1965 | Forest et al. | 99/8 |
| 3,284,212 A | | 11/1966 | Tribble | 99/9 |
| 4,335,148 A | * | 6/1982 | Vidal et al. | 426/319 |
| 4,338,343 A | | 7/1982 | Vidal | 426/331 |
| 4,508,737 A | | 4/1985 | Forest | 426/54 |
| 4,780,325 A | * | 10/1988 | Miller | 426/54 |
| 4,970,080 A | * | 11/1990 | Laurent et al. | 424/684 |
| 5,786,007 A | * | 7/1998 | Webb | 426/74 |

OTHER PUBLICATIONS

Mathison et al., Can J. Animal Sci., vol. 68 pp. 1209–1233, Dec. 1988.*

* cited by examiner

*Primary Examiner*—Chhaya D. Sayala
(74) *Attorney, Agent, or Firm*—Sughrue Mion, PLLC

(57) ABSTRACT

A method for preserving animal feed, including pet food, by controlling mold and yeast growth during the storage of such feed is disclosed, wherein the feed comprises processed grains, and optionally molasses, by adding to the processed grain or to the total feed mix, an amount of an alkali metal sulfite, bisulfite, metabisulfite or mixtures thereof sufficient to arrest the destructive effects of oxidation, mainly mold growth, which occurs during the storage of such animal feed. The alkali metal sulfite, bisulfite or metabisulfite is preferably added to the animal feed, together with an inorganic sulfate.

21 Claims, No Drawings

METHOD FOR PRESERVING PROCESSED GRAIN AND ANIMAL FEED COMPRISING THE SAME

FIELD OF THE INVENTION

The present invention relates to a method for preserving processed grains, such as steam-flaked or steam-rolled grains, and to animal feed comprising the same, and optionally also comprising molasses, by use of alkali metal sulfite, bisulfite, metabisulfite or mixtures.

BACKGROUND OF THE INVENTION

The use of sulfite containing additives to preserve food by scavenging oxygen has long been known, as described in various issued patents, e.g., U.S. Pat. No. 2,799,583 (Harris), U.S. Pat. No. 2,825,651 (Loo et al), U.S. Pat. No. 3,169,068 (Block) and U.S. Pat. No. 3,284,212 (Tribble).

Prior art uses of sodium metabisulfite for silage preservation purposes, such as is described in the above-noted Harris patent, have primarily been concerned with the preservation of silages through removal of oxygen to inhibit spoilage based on the growth of oxygen-dependent mold or bacteria, as part of a fermentation cycle of fresh harvested forage stored on a farm site.

Harris describes a process for the preservation of silage, which may include unprocessed grain, by the addition of an alkaline metabisulfite and urea. The urea is present to control the corrosivity of the metabisulfites toward ferrous metals used in the construction of silos. The proportion of metabisulfite is said, by Harris, not to be critical and is said to vary from about 0.1 to 1.0%, by weight, or from 2–20 lbs/ton of silage.

On the contrary, as will be described more fully below, the process and compositions of this invention is concerned with processed grains, such as steam-flaked or steam-rolled grains and others as described below, and/or animal feed comprising such grains, and optionally molasses, and to prevention of mold and yeast growth in the animal feed. These grains or feed are not intended for a fermentation process of any kind.

U.S. Pat. No. 3,184,314 describes preservation and controlling of fermentation of high moisture content grain silages by the use of compositions comprising (a) and alkali or alkaline earth metal sulfate salt, and (b) an amylolytic enzyme, preferably malt diastase.

In U.S. Pat. No. 4,508,737, it was found that superior, fast acting preservation of and fermentation control for various silages and stored grains, especially high moisture content grains, can be provided by use of 0.2–1.5 lbs of alkali metal sulfite, alkali metal bisulfite, alkali metal metabisulfite or mixtures thereof.

In both U.S. Pat. No. 3,184,314 and U.S. Pat. No. 4,508,737, fermentation control was the key factor for adequate preservation of fresh harvested forages on the farm.

It has now been found in the present invention that preservation during the storage of animal feeds, particularly commercially manufactured animal feeds, such as cattle feed, swine feed, poultry feed, horse feeds, and pet feed, comprising processed grains and optionally molasses, can be achieved by applying the compositions of this invention during the manufacturing process, either directly onto the grain, into the total feed mix, and/or into the added molasses.

The use of propionic acid usually about 1–2% by weight of processed grains has gained wide acceptance. While this method is effective for inhibiting microbial growth, grains treated with these large amounts of propionic acid are often unacceptable when it comes to odor and palatability to the animal, denoted by reduced intake by animals. Industry practice is to use less than 1% propionic acid with the result of solving only partially the problem of moldy animal feed.

SUMMARY OF THE INVENTION

The invention relates to the preservation of animal feed, particularly commercially produced animal feed, such as cattle feed, horse feed, swine feed, poultry feed or pet (e.g., dog, cat, or bird) feeds, which comprise processed grains, such as steam-flaked grains or steam-rolled grains, and others as described below and optionally molasses.

In order to provide palatable animal feed, free from tastes or odors which would discourage feeding and still retain a high proportion of nutrient and vitamin values, it has been found to be essential to stop undesired oxygen-dependent mold and yeast growth as quickly as possible during the manufacturing process, and continuing such preservation during a reasonable period, 30–45 or more days for example, when such feed is in commercial warehouse storage waiting to be distributed for final feeding to animals.

The present composition achieves this dual result in a uniquely effective way by adding from about 0.1 to 2 lbs/ton of processed grain, of an alkali metal sulfite, bisulfite, metabisulfite or mixtures thereof. If the amount is below about 0.05 lbs/ton, the effect is inadequate to produce the desired mold control effect. Sulfite amounts at the lower end of the range have been found particularly effective with a sulfite amount of 0.1 to 1.5 lbs/ton of processed grain. Preferably, the amount of said compound is in the range of from 0.1 to 0.8 lbs/ton of processed grain.

The compositions may be applied directly to the processed grains or in the total feed mix in any known manner practical for production runs; as for example, by preparing the composition in a liquid aqueous solution and spraying the solution or formulating the composition in dry granular form and applying at the point most appropriate in the manufacturing procedure, after the grain has been processed, assuring thorough coverage.

The compositions are particularly effective in reducing mold and yeast growth on the processed grain, such processed grains being defined as follows: grain already dried at 10–12% moisture undergo a variety of processes which crack the hull or remove the hull from the grain, exposing the internal nutrients of the grain. Such processes, including but not limited to those described below, are required by manufacturers to make such grains usable for the production of animal feed, causing exposure of grain nutrients to additional moisture thereby causing problems with mold and yeast growth during storage in factory bins while awaiting production runs, storage time being from a few hours to a few days.

Commonly used processes include steam-flaking or steam-rolling at high temperatures in excess of 200° F., the final moisture being 14–16% when coming out of the cooler system; groats (de-hulled grain), as well as cracked, crimped or ground grain, which although not exposed to additional steam and heat, contain exposed nutrients of the grain which absorb sufficient moisture during the storage and feed mixing processes, causing mold problems in the final feed. Processed grains also include the by-products of processed grains by the food industry which are purchased by the manufacturers of animal feed, such as grain hulls, and granular particles known as middlings, which are rejected by the flour processing industry, such by-products containing hulls or various granular size grain particles, which are often used in animal feeds as a filler or a fiber source to arrive at a total final feed mixture.

Applying the present composition directly on the processed grains, or in the feed mix or to added molasses significantly reduces the mold and yeast growth during the manufacturing process.

Additionally, preservation with the present composition continues to be uniquely effective during normal storage conditions after the totally mixed animal feed leaves the factory, packaged in 50-pound bags or is stored in bulk bins until it is finally fed to the animal. Curbing mold and yeast growth is the key factor in keeping such feed nutritious and fresh for animal consumption.

DETAILED DESCRIPTION OF THE INVENTION

The use of certain effective amounts of alkali metal sulfite, bisulfite, metabisulfite or mixtures thereof have been discussed in the present invention to permit both effective protection of the processed grains and/or total feed mixes from the effects of the growth of aerobic molds, and also contributes to the desired preservation of fresh consumable feed. Effective amounts of the alkali metal sulfite, bisulfite or metabisulfite are from about 0.1 to 2 lbs/ton of processed grain, preferably 0.1 to 1.5 lbs/ton of the processed grain.

The function of the alkali metal sulfite, bisulfite, or metabisulfite, sodium metabisulfite acts to arrest the reproduction of mold and yeasts sufficiently to ensure the preservation of the grains and/or total animal feed mix. The preservation starts from the moment it is applied on the on the grain or feed, and continues in the factory grain bin, as well as through the period of time of commercial storage of such animal feed, often packaged in 50-pound bags, or in bulk bins, before it is fed to animals.

Ultimately, the use of the composition prevents the growth of aerobic molds and yeasts, which are undesirable in animal or pet feed, often causing lower intake and, in many cases, causing various illnesses in animals. With the presence of the oxygen scavenging alkali metal sulfite, bisulfite or metabisulfite, the respiration of such molds and yeasts are arrested sufficiently to reduce their growth to a harmless level for consumption of feed by the animal.

In achieving mold control in animal feed, an important advantage of the invention is that it increases the palatability and nutritional value of the feed, in addition to avoiding the frequent returns of bagged feed to commercial plants due to excessive spoilage. During the commercial storage period, which is commonly 30–45 days, various molds and yeasts form in the feed due to elevated warehouse temperatures, especially when higher than 80° F. in spring and summer months. With the present method and compositions, however, mold control is achieved during 45 or more days of commercial storage, at temperatures of 85° F. or more, yielding a preserved, palatable animal feed.

For maximum advantage to be taken of the process, the alkali metal sulfite, bisulfite or metabisulfite should be applied to the processed grains and/or total feed mixes with preferably additional inorganic sulfate, especially when the composition is formulated in a dry form. In its liquid form, the composition should include as well an alkaline base chemical, such as sodium hydroxide or potassium hydroxide, to neutralize the pH to a level between 5.7 to 6.8, preferably between 6.0 to 6.3.

The particular inorganic sulfate employed is not critical to the present invention. Examples of the inorganic sulfate include sodium sulfate, sodium bisulfate, potassium sulfate, potassium bisulfate, magnesium sulfate, magnesium bisulfate, and ammonium sulfate, ammonium bisulfate, preferably sodium sulfate or sodium bisulfate.

The amount of inorganic sulfate which can be employed in the present invention ranges from 20%–90% of the composition or 0.2 to 0.9 lbs/ton of processed grain, preferably 0.5 to 0.7 lbs/ton of processed grain.

The preferred compositions of the present invention comprise the following ingredients in the indicated amounts:

| Constituent | Amount |
| --- | --- |
| (a) alkali metal or alkaline earth metal sulfite, bisulfite or metabisulfite | 0.1 to 2 lbs/ton of processed grain |
| (b) alkali metal or alkaline earth metal sulfate | 0.2 to less than 2 lbs/ton of processed grain |

In addition, surfactants, such as formalin, may also be added to the processed grain and/or total feed mixes. Any other suitable non-toxic surfactant, preferable dimethyl polysiloxane to help wetting and spreading of the composition throughout the grain or feed mix can also be used. Anionic, cationic amphoteric, and non-ionic surfactants have all proved useful. Examples of suitable surfactants which may be used include, but are not limited to, sodium alkylsulfonethanolamine, dimethylpolysiloxane ammonium alkylarylpolyether-sulfonate, sodium alkylarylpolyethersulfonate, sulfonated fatty acids and lignin sulfonate and its salts.

The amount of molasses employed in the present invention is not critical thereto. Generally, when molasses is applied, the amount of molasses employed in the feed is in the range of 4 to 14% of the feed, preferably 6 to 8% of the feed.

The type of grain which forms the processed grains is not critical to the present invention. Examples of such grains include corn, oats, barley, wheat, milo, soybeans, sorghum, rice, peanuts, canola, rye, cotton seeds, triticale, and grain which are mixed with molasses in certain pet feeds, such as, sunflower, canola, flaxseed, rapeseed, safflower, sesame.

The moisture content of the processed grain in the present invention is generally about 13–18%, preferably about 14–17%.

The following examples are provided for illustrative purposes only and are in no way intended to limit the scope of the invention.

EXAMPLE 1

Storage Study Involving Steam-Rolled Corn

Steam-rolling: clean mill-run corn was conditioned for about 15–20 minutes to a moisture content of about 18–20% and a final temperature of 210° F. The conditioned grain was then rolled to a density of about 32 lb/cu ft (vs. 45 lbs/cu ft whole). The steam-rolled grain was then cooled to an ambient temperature and moisture in a horizontal cooler. The final moisture content was determined to be about 16% by using an air oven method. Enough grain was processed to accomplish all treatments in the study with a single lot of grain.

Mixing: the rolled grains were weighed and added to the mixer (not running). Where the Composition (defined below) was to be added to the grain, the mixer was started and the liquid applied via a stainless steel garden sprayer. Mixing continued for 30 seconds after the last of the Composition was applied. The grain was allowed to "rest" for about 10–15 minutes while the molasses was prepared for application.

The molasses was pre-weighed for each batch and blended with the Composition when necessary. The molasses was applied to the grain using a small bucket with a perforated bottom to facilitate even distribution on the grain.

The following table (Table A) outlines the treatments used in this storage study.

TABLE A

| Treatments | | |
|---|---|---|
| Treatment | Corn | Molasses |
| A | No treatment of Grain | 8% (160 lbs) molasses/total feed |
| B | No treatment of Grain | 6 lbs of COMP[1]/ton of molasses, then, 8% molasses was added per total feed |
| C | 2 lbs of COMP/ton of grain | 8% molasses/total feed |
| D | 2 lbs of COMP/ton of grain | 6 lbs of COMP/ton of molasses, then, 8% molasses was added per total feed |

[1]COMP = Composition

Composition: The Composition in this trial contained 0.23–0.25 lbs of sodium bisulfite per pound of the Composition, 0.04–0.05 lbs of potassium hydroxide and 70–73% water.

At 2 lbs/ton of grain, the application of bisulfite was 0.46–0.5 lbs/ton of grain. When 6 lbs of the Composition was blended in one ton of molasses, the resulting application of the sodium bisulfite per ton of molasses was 1.38 lbs, and when molasses was added at 8% per total feed, the resulting net application was 0.11 lbs of sulfite/ton of grain.

Following treatment, the grain was discharged into multi-wall paper bags at 10 lbs each.

To simulate "Summer time" Storage: Twenty-five bags from each treatment were stored on mini-pallets in an environmentally controlled chamber. Conditions within the chamber were maintained at 37° C.±1° C. and 70% humidity. Three bags from each treatment were chosen by its level on the pallet (low, medium and high) and monitored biweekly for temperature change.

Sampling: three bags were randomly chosen and removed from each treatment on a biweekly basis for analysis. Upon opening, the contents were poured through a large sample divider several times to secure the appropriate size analytical sample (ea. 200 gm). In the event that the bag content was solidly caked, the cake was broken as well as possible and a representative sample secured.

Samples were collected from all treatments at Day 0, Day 14, Day 28 and Day 56.

Total mold, total yeast, and total colony forming units (CFUs) were determined for weeks 2, 4 and 8. Mold species present at each week were also determined. The results of this study are shown in Table B below.

TABLE B

Results of Microbial Analysis

| Treatment* | Week | Molds | Yeast | Total CFUs | Mold Species |
|---|---|---|---|---|---|
| A | 0 | 275 | 400 | 675 | A. glaucus, A flavus, Penicillium sp., Mucor sp., Cladosporium sp. |
| | 1 | 560 | 50 | 610 | A. glaucus, A. flavus, A. versicolor, A. candidus, Penicillium sp., Cladosporium |
| | 2 | 615000 | 10 | 615010 | A. glaucus |
| | 4 | 945000 | 10 | 945010 | A. glaucus |
| | 8 | 1370000 | 10 | 1370010 | A. glaucus |
| B | 0 | 405 | 700 | 1105 | A. glaucus, A. flavus, Penicillium sp., Mucor sp., |
| | 1 | 75 | 200 | 275 | A. glaucus, Fusarium sp. |
| | 2 | 7000 | 10 | 7010 | A. glaucus |
| | 4 | 1500 | 10 | 1510 | A. glaucus |
| | 8 | 2000 | 10 | 2010 | A. glaucus |
| C | 0 | 140 | 2150 | 2290 | A. glaucus, A. flavus, A. versicolor, Penicillium Sp., Cladosporium sp. |
| | 1 | 1150 | 1000 | 2150 | A. glaucus, A. versicolor, Cladosporium sp. |
| | 2 | 2005 | 1500 | 3505 | A. glaucus, Fusarium sp. |
| | 4 | 8500 | 3000 | 11500 | A. glaucus |
| | 8 | 605 | 850 | 1455 | A. glaucus, Mucor sp. |
| D | 0 | 70 | 500 | 570 | A. glaucus, Mucor sp., Cladosporium sp., Fusarium moniliforme |
| | 1 | 80 | 10 | 90 | A. glaucus, Mucor sp., Fusarium sp. |
| | 2 | 100 | 10 | 110 | A. glaucus |
| | 4 | 100 | 300 | 400 | A. glaucus, Penicillium sp., Cladosporium sp. |
| | 8 | 3500 | 50 | 3550 | A. glaucus |

*Grain = Steam-Rolled Corn

It is evident from Table B above, that when the Composition was applied to the processed grain, either directly or through the molasses, or both, substantial microbial control was obtained.

While the invention has been described in detail and with reference to specific embodiments thereof, it will be apparent to one skilled in the art that various changes and modifications can be made therein without departing from the spirit and scope thereof.

What is claimed is:

1. A method for preservation of processed grain comprising mixing said grain with a composition consisting essentially of a compound selected from the group consisting of an alkali metal sulfite, bisulfite, metabisulfite or mixtures thereof, said compound being present in an amount of 0.1 to 2 lbs/ton of processed grain, wherein said processed grain is selected from the group consisting of steam-flaked grain, steam-rolled grain, de-hulled grain, cracked grain, crimped grain, ground grain and by-products thereof.

2. The method of claim 1, wherein the amount of said compound is in the range of from 0.1 to 1.5 lbs/ton of processed grain.

3. The method of claim 2, wherein the amount of said compound is in the range of from 0.1 to 0.8 lbs/ton of processed grain.

4. The method of claim 1, wherein said composition further comprises inorganic sulfate.

5. The method of claim 4, wherein said sulfate is employed in an amount of from 0.2 to 0.9 lbs/ton of processed grain.

6. The method of claim 5, wherein said sulfate is employed in an amount of from 0.5 to 0.7 lbs/ton of processed grain.

7. A method for preservation of an animal feed comprising processed grain, and optionally molasses, said method comprising mixing said feed with a composition consisting essentially of a compound selected from the group consisting of an alkali metal sulfite, bisulfite, metabisulfite or mixtures thereof, said compound being present in an amount of 0.1 to 2 lbs/ton of processed grain, wherein said processed grain is selected from the group consisting of steam-flaked grain, steam-rolled grain, de-hulled grain, cracked grain, crimped grain, ground grain and by-products thereof.

8. The method of claim 7, wherein the amount of said compound is in the range of from 0.1 to 1.5 lbs/ton processed grain.

9. The method of claim 8, wherein the amount of said compound is in the range of from 0.1 to 0.8 lbs/ton of processed grain.

10. The method of claim 7, wherein said composition further comprises inorganic sulfate.

11. The method of claim 10, wherein said sulfate is employed in an amount of from 0.2 to 0.9 lbs/ton of processed grain.

12. The method of claim 11, wherein said sulfate is employed in an amount of from 0.5 to 0.7 lbs/ton of processed grain.

13. The method of claim 7, wherein said feed comprises molasses in an amount of from 4 to 14% of the feed.

14. The method of claim 13, wherein said feed comprises molasses in an amount of from 14 to 17% of the feed.

15. The method of claim 7, wherein said animal feed is cattle feed, horse feed, swine feed, poultry feed or pet feed.

16. The method of claim 1, wherein said processed grain is selected from the group consisting of processed corn, oats, barley, wheat, milo, soybeans, sorghum, rice, peanuts, canola, rye, cotton seeds, triticale, sunflower, canola, flaxseed, rapeseed, safflower, and sesame.

17. The method of claim 1, wherein said processed grain has a moisture content of about 13–18%.

18. The method of claim 17, wherein said processed grain has a moisture content of about 14–17%.

19. The method of claim 7, wherein said processed grain is selected from the group consisting of processed corn, oats, barley, wheat, milo, soybeans, sorghum, rice, peanuts, canola, rye, cotton seeds, triticale, sunflower, canola, flaxseed, rapeseed, safflower, and sesame.

20. The method of claim 7, wherein said processed grain has a moisture content of about 13–18%.

21. The method of claim 20, wherein said processed grain has a moisture content of about 14–17%.

* * * * *